(12) United States Patent
Mosby

(10) Patent No.: US 6,490,980 B1
(45) Date of Patent: Dec. 10, 2002

(54) MASS TRANSIT VEHICLE SYSTEM

(76) Inventor: Wayne G. Mosby, 1402 Park St., Sumner, WA (US) 98390

( * ) Notice: Subject to any disclaimer, the term of this patent is extended or adjusted under 35 U.S.C. 154(b) by 0 days.

(21) Appl. No.: 10/006,821

(22) Filed: Oct. 26, 2001

(51) Int. Cl.[7] .............................................. B16D 17/00
(52) U.S. Cl. .................................................... 105/397
(58) Field of Search ................................ 105/397, 396, 105/416, 3, 4.1, 4.4, 72.2; 180/14.1, 14.4; 280/402, 33.991

(56) References Cited

U.S. PATENT DOCUMENTS

| | | | | |
|---|---|---|---|---|
| 1,807,793 A | * | 6/1931 | Moore ........................ | 105/72.2 |
| 1,908,437 A | * | 5/1933 | Nelson ....................... | 105/72.2 |
| 2,012,260 A | * | 8/1935 | Saint-Martin ................. | 105/3 |
| 2,027,684 A | * | 1/1936 | Fageol ....................... | 105/72.2 |
| 2,216,547 A | * | 10/1940 | Christianson ................. | 105/3 |
| 2,263,578 A | | 11/1941 | Hickman | |
| 2,399,929 A | | 5/1946 | Kearns | |
| D156,727 S | | 1/1950 | Graham | |
| 2,843,417 A | * | 7/1958 | Wahl et al. .................... | 105/18 |
| 2,865,306 A | | 12/1958 | Bock et al. | |
| 3,719,244 A | * | 3/1973 | Miller et al. .................. | 180/12 |
| 4,318,345 A | * | 3/1982 | Kleim ........................ | 105/15 |
| 4,569,192 A | * | 2/1986 | Yamada et al. ............... | 19/238 |
| 4,596,192 A | * | 6/1986 | Forster ....................... | 104/118 |

FOREIGN PATENT DOCUMENTS

EP      4012704 A1   *   10/1991

* cited by examiner

Primary Examiner—S. Joseph Morano
Assistant Examiner—Frantz F. Jules

(57) ABSTRACT

A mass transit vehicle system for improving the efficiency and flexibility in developing scalable mass transit systems. The mass transit vehicle system includes a drive unit for providing locomotive force for the system and includes steerable front wheels for facilitating turning the system and a motor for generating said locomotive force, a passenger section for carrying a plurality of passengers which is couplable to said drive unit and includes at least two wheels for facilitating moving the passenger section with the drive unit, and a mating section for facilitating coupling of the passenger section to the drive unit and providing an environmental barrier such that an interior of the passenger section and an interior of the drive unit are in environmental communication, but are protected from an external environment.

8 Claims, 3 Drawing Sheets

MASS TRANSIT VEHICLE SYSTEM

BACKGROUND OF THE INVENTION

1. Field of the Invention

The present invention relates to mass transit systems and more particularly pertains to a new mass transit vehicle system for improving the efficiency and flexibility in developing scalable mass transit systems.

2. Description of the Prior Art

The use of mass transit systems is known in the prior art. More specifically, mass transit systems heretofore devised and utilized are known to consist basically of familiar, expected and obvious structural configurations, notwithstanding the myriad of designs encompassed by the crowded prior art which have been developed for the fulfillment of countless objectives and requirements.

Known prior art includes U.S. Pat. No. 2,399,929; U.S. Pat. No. 2,865,306; U.S. Pat. No. 4,596,192; U.S. Pat. No. 2,843,417; U.S. Pat. No. 2,263,578; and U.S. Pat. No. Des. 1,567,277.

While these devices fulfill their respective, particular objectives and requirements, the aforementioned patents do not disclose a new mass transit vehicle system. The inventive device includes a drive unit for providing locomotive force for the system and includes steerable front wheels for facilitating turning the system and a motor for generating said locomotive force, a passenger section for carrying a plurality of passengers which is couplable to said drive unit and includes at least two wheels for facilitating moving the passenger section with the drive unit, and a mating section for facilitating coupling of the passenger section to the drive unit and providing an environmental barrier such that an interior of the passenger section and an interior of the drive unit are in environmental communication, but are protected from an external environment.

In these respects, the mass transit vehicle system according to the present invention substantially departs from the conventional concepts and designs of the prior art, and in so doing provides an apparatus primarily developed for the purpose of improving the efficiency and flexibility in developing scalable mass transit systems.

SUMMARY OF THE INVENTION

In view of the foregoing disadvantages inherent in the known types of mass transit systems now present in the prior art, the present invention provides a new mass transit vehicle system construction wherein the same can be utilized for improving the efficiency and flexibility in developing scalable mass transit systems.

The general purpose of the present invention, which will be described subsequently in greater detail, is to provide a new mass transit vehicle system apparatus and method which has many of the advantages of the mass transit systems mentioned heretofore and many novel features that result in a new mass transit vehicle system which is not anticipated, rendered obvious, suggested, or even implied by any of the prior art mass transit systems, either alone or in any combination thereof.

To attain this, the present invention generally comprises a drive unit for providing locomotive force for the system and includes steerable front wheels for facilitating turning the system and a motor for generating said locomotive force, a passenger section for carrying a plurality of passengers which is couplable to said drive unit and includes at least two wheels for facilitating moving the passenger section with the drive unit, and a mating section for facilitating coupling of the passenger section to the drive unit and providing an environmental barrier such that an interior of the passenger section and an interior of the drive unit are in environmental communication, but are protected from an external environment.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new mass transit vehicle system apparatus and method which has many of the advantages of the mass transit systems mentioned heretofore and many novel features that result in a new mass transit vehicle system which is not anticipated, rendered obvious, suggested, or even implied by any of the prior art mass transit systems, either alone or in any combination thereof.

It is another object of the present invention to provide a new mass transit vehicle system which may be easily and efficiently manufactured and marketed.

It is a further object of the present invention to provide a new mass transit vehicle system which is of a durable and reliable construction.

An even further object of the present invention is to provide a new mass transit vehicle system which is susceptible of a low cost of manufacture with regard to both materials and labor, and which accordingly is then susceptible of low prices of sale to the consuming public, thereby making such mass transit vehicle system economically available to the buying public.

Still yet another object of the present invention is to provide a new mass transit vehicle system which provides in the apparatuses and methods of the prior art some of the advantages thereof, while simultaneously overcoming some of the disadvantages normally associated therewith.

Still another object of the present invention is to provide a new mass transit vehicle system for improving the efficiency and flexibility in developing scalable mass transit systems.

Yet another object of the present invention is to provide a new mass transit vehicle system which includes a drive unit for providing locomotive force for the system and includes steerable front wheels for facilitating turning the system and a motor for generating said locomotive force, a passenger section for carrying a plurality of passengers which is couplable to said drive unit and includes at least two wheels for facilitating moving the passenger section with the drive unit, and a mating section for facilitating coupling of the passenger section to the drive unit and providing an environmental barrier such that an interior of the passenger section and an interior of the drive unit are in environmental communication, but are protected from an external environment.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
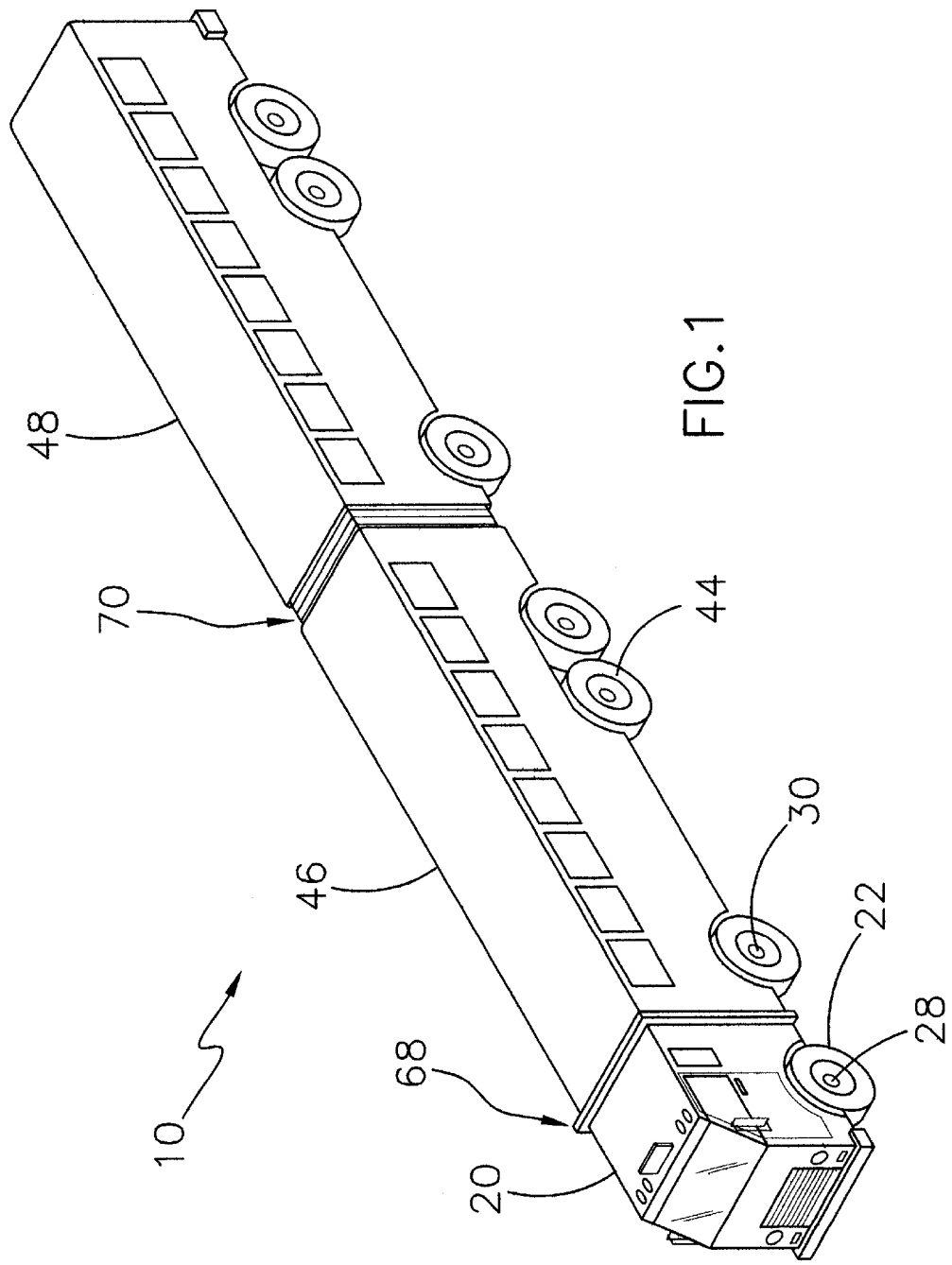
FIG. 1 is a schematic perspective view of a new mass transit vehicle system according to the present invention.
Figure 2:
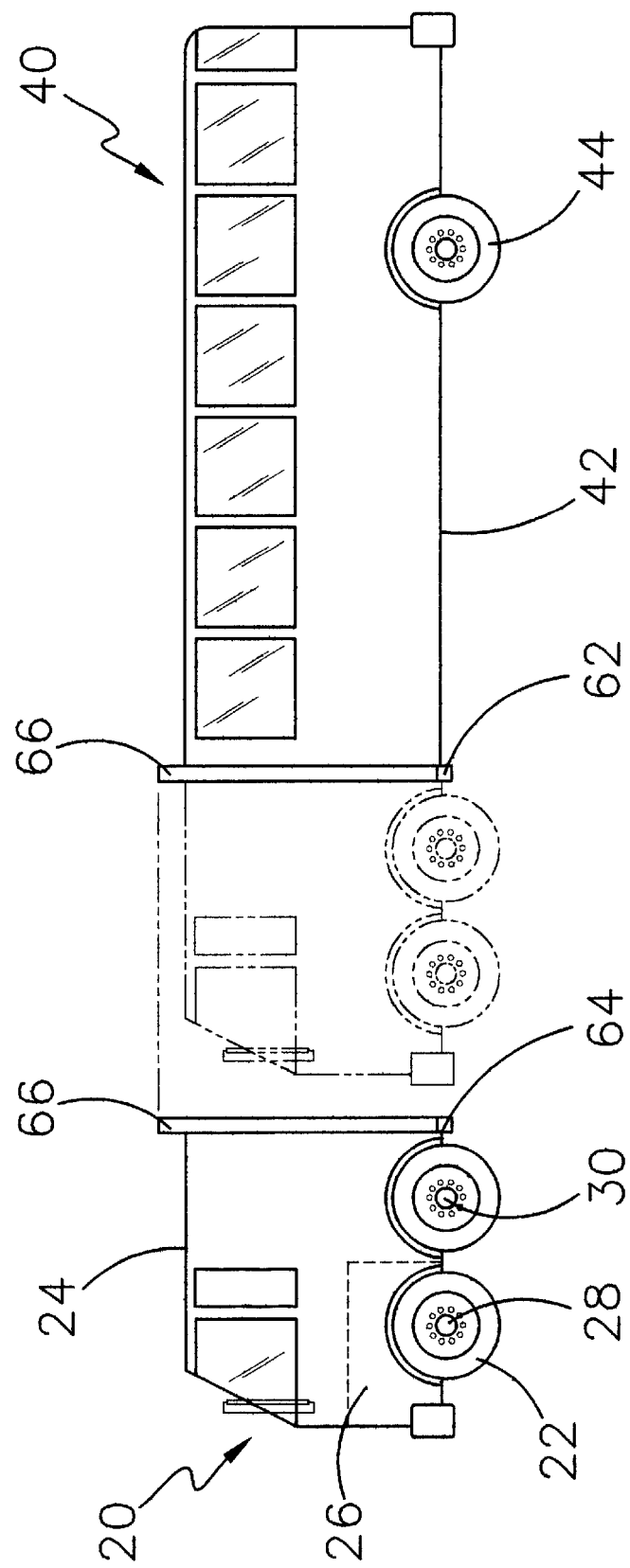
FIG. 2 is a schematic side view of the present invention.
Figure 3:
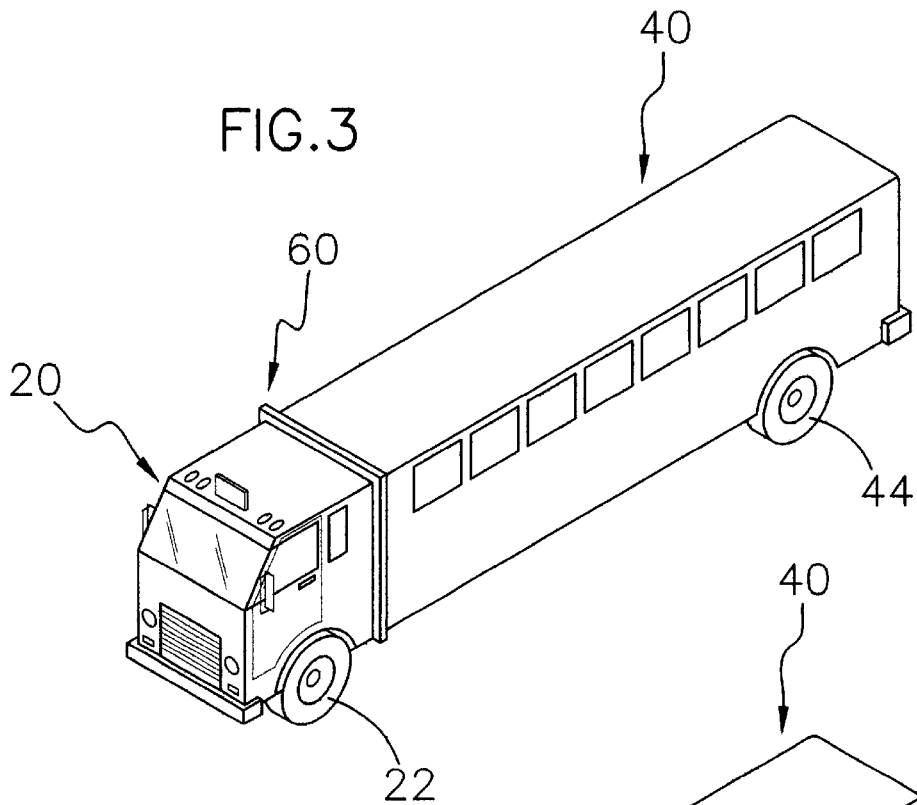
FIG. 3 is a schematic perspective view of an embodiment of the present invention.
Figure 4:
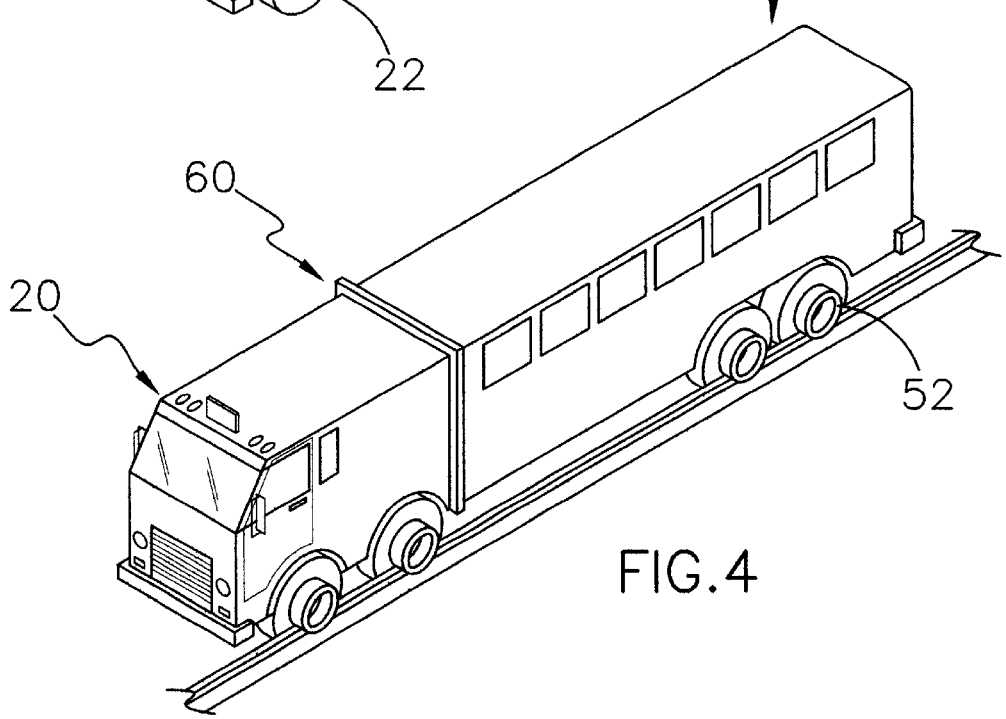
FIG. 4 is a schematic perspective view of an alternate embodiment of the present invention.

With reference now to the drawings, and in particular to FIGS. 1 through 4 thereof, a new mass transit vehicle system embodying the principles and concepts of the present invention and generally designated by the reference numeral 10 will be described.

As best illustrated in FIGS. 1 through 4, the mass transit vehicle system 10 generally comprises a drive unit 20, a passenger section 40, and a mating section 60.

The drive unit 20 provides locomotive force for the system 10. The drive unit 20 includes steer-able front wheels 22 for facilitating turning the system 10. The drive unit 20 also includes a housing 24, which defines an interior motor space and an interior passenger space. The drive unit 20 includes a motor 26 for generating the locomotive force.

The passenger section 40 is used for carrying a plurality of passengers or cargo. The passenger section 40 is couplable to the drive unit 20. The passenger section 40 includes a housing 42, which defines an interior space. The passenger section 40 includes at least two wheels 44 for facilitating moving the passenger section 40 with the drive unit 20.

The mating section 60 is used for facilitating coupling the passenger section 40 to the drive unit 20. The mating section 60 provides an environmental barrier such that an interior of the passenger section 40 and an interior of the drive unit 20 are in environmental communication, but are protected from an external environment.

The drive unit 20 further comprises a forward axle 28 and a rear axle 30. The forward axle 28 includes two steer-able wheels 22 for facilitating turning the system 10. At least one of the forward 28 and rear axles 30 is coupled to the motor 26 for propelling the system 10.

In an embodiment the passenger section 40 further comprises first 46 and second passenger cars 48. The first passenger car 46 is coupled to the drive unit 20 through a first mating section 68 such that the first mating section 68 forms an articulation point between the drive unit 20 and the first passenger car 46 for facilitating turning the system 10. The second passenger car 48 is similarly coupled to the first passenger car 46 through a second mating section 70 such that the second mating section 70 forms a second articulation point between the first passenger car 46 and the second passenger car 48 for facilitating turning the system 10. An interior of the second passenger car 48 is in environmental communication with an interior of the first passenger car 46.

In a further embodiment, a second set of wheels 50 is designed for engaging a rail such that the system 10 runs along both a predefined route and a driver selected route. Thus the system 10 operates along a railroad or a surface road.

In still a further embodiment, the mating section 60 further comprises a hydraulic hitch assembly, and a collar portion 66. The hydraulic hitch assembly includes a hitch portion 62 and a holding portion 64. The holding portion 64 is for selectively engaging the hitch portion 62 such that the passenger section 40 is selectively couplable to the drive unit 20. The collar portion 66 is designed for providing an environmental barrier between an interior of the system 10 and an external environment. The collar portion 66 is substantially tubular such that an interior of the drive unit 20 is in environmental communication with an interior of the passenger section 40.

In use, the drive unit may be used with a variety of different passenger sections including but not limited to bus configurations, cargo and freight hauling configurations, and passenger train configurations. To facilitate the multiple usages between one and four steerable axles may be used. The passenger sections may be recycled chassis from busses, trailers, or rail cars. The drive unit may utilize a gas fired turbine engine capable of delivering between 500 and 2500 horsepower.

Additional configurations may allow for cascading a plurality of cars together for over the road or rail usage. Thus the mass transit vehicle system is scalable for meeting the demands of particular routes with differing traffic patterns.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. A mass transit vehicle system comprising:

a drive unit for providing locomotive force for said system, said drive unit having steerable front wheels for facilitating turning said system, said drive unit having a housing defining an interior motor space and an interior passenger space, said drive unit having a motor for generating said locomotive force;

a passenger section for carrying a plurality of passengers, said passenger section being couplable to said drive unit, said passenger *** section having a housing defining an interior space, said passenger section having at least two wheels for facilitating moving an associated one of said passenger sections with said drive unit;

a mating section for facilitating coupling of one of said passenger section to said drive unit, said mating section providing an environmental barrier such that an interior of said passenger section and an interior of said drive unit are in environmental communication, but are protected from an external environment;

wherein said mating section further comprises:

a hydraulic hitch assembly, said hydraulic hitch assembly havina a hitch portion and a holding portion, said holding portion being for selectively encaging said hitch portion such that said passenger section is selectively couplable to said drive unit; and an collar portion adapted for providing an environmental barrier between an interior of said system and an external environment, said collar portion being substantially tubular such that an interior of said drive unit is in environmental communication with an interior of said passenger section.

2. The mass transit vehicle system of claim 1, wherein said drive unit further comprises:

forward axle and a rear axle, said forward axle having two steerable wheels for facilitating turning said system;

at least one of said forward and rear axles being coupled to said motor for propelling said system.

3. The mass transit vehicle system of claim 2, wherein each of said wheels being adapted for engaging a rail such that said system runs along a predefined route.

4. The mass transit vehicle system of claim 2, further comprising a second set of wheels adapted for engaging a rail such that said system runs along both a predefined route and a driver selected route whereby said system operates along a railroad or a surface road.

5. The mass transit vehicle system of claim 1, wherein said passenger section further comprises:

a plurality of passenger cars, each one of said passenger cars being coupled to at least one other passenger car, each one of said passengers cars being coupled to said other passenger car by a mating section.

6. The mass transit vehicle system of claim 5 wherein said plurality of passenger cars further comprises:

a first passenger car couple to said drive unit through a first mating section such that said first mating section forming an articulation point between said drive unit and said first passenger car for facilitating turning said system;

a second passenger car couple to said first passenger car through a second mating section such that said second mating section forming a second articulation point between said first passenger car and said second passenger car for facilitating turning said system, an interior of said second passenger car being in environmental communication with an interior of said first passenger car.

7. The mass transit vehicle system of claim 5 wherein said plurality of passenger cars further comprises:

a first passenger car couple to said drive unit through a first mating section such that said first mating section forming an articulation point between said drive unit and said first passenger car for facilitating turning said system;

a second passenger car couple to said first passenger car through a second mating section such that said second mating section forming a second articulation point between said first passenger car and said second passenger car for facilitating turning said system, an interior of said second passenger car being in environmental communication with an interior of said first passenger car:

a third passenger car couple to said second passenger car through a third mating section such that said third mating section forming a third articulation point between said second passenger car and said third passenger car for facilitating turning said system, an interior of said third passenger car being in environmental communication with an interior of said second passenger car;

a fourth passenger car couple to said third passenger car through a fourth mating section such that said fourth mating section forming a fourth articulation point between said third passenger car and said fourth passenger car for facilitating turning said system, an interior of said fourth passenger car being in environmental communication with an interior of said third passenger car;

a fifth passenger car couple to said fourth passenger car through a fifth mating section such that said fifth mating section forming a fifth articulation point between said fourth passenger car and said fifth passenger car for facilitating turning said system, an interior of said fifth passenger car being in environmental communication with an interior of said fourth passenger car.

8. A mass transit vehicle system comprising:

a drive unit for providing locomotive force for said system, said drive unit having steerable front wheels for facilitating turning said system, said drive unit having a housing defining an interior motor space and an interior passenger space, said drive unit having a motor for generating said locomotive force;

a plurality of passenger sections for carrying a plurality of passengers, each of said passenger sections being couplable to said drive unit, each of said passenger sections having a housing defining an interior space, each of said passenger sections having at least two wheels for facilitating moving an associated one of said passenger sections with said drive unit;

a mating section for facilitating coupling of one of said passenger sections to said drive unit, said mating section providing an environmental barrier such that an interior of the associated one of said passenger sections and an interior of said drive unit are in environmental communication, but are protected from an external environment said drive unit further comprises:

forward axle and a rear axle, said forward axle having two steerable wheels for facilitating turning said system;

at least one of said forward and rear axles being coupled to said motor for propelling said system;

wherein said plurality of passenger sections further comprises:

a first passenger car couple to said drive unit through a first mating section such that said first mating section forming an articulation point between said drive unit and said first passenger car for facilitating turning said system;

a second passenger car couple to said first passenger car through a second mating section such that said second mating section forming a second articulation point between said first passenger car and said second passenger car for facilitating turning said system, an interior of said second passenger car being in environmental communication with an interior of said first passenger car;

a second set of wheels adapted for engaging a rail such that said system runs along both a predefined route and a driver selected route whereby said system operates along a railroad or a surface road;

wherein said mating section further comprises:

a hydraulic hitch assembly, said hydraulic hitch assembly having a hitch portion and a holding portion, said holding portion being for selectively engaging said hitch portion such that one of said passenger sections is selectively couplable to said drive unit;

a collar portion adapted for providing an environmental barrier between an interior of said system and an external environment, said collar portion being substantially tubular such that an interior of said drive unit is in environmental communication with an interior of one of said passenger sections.

\* \* \* \* \*